United States Patent
Maeda

(10) Patent No.: US 9,571,019 B2
(45) Date of Patent: Feb. 14, 2017

(54) CONTROL DEVICE OF MOTOR, ELECTRONIC APPARATUS, RECORDING APPARATUS, ROBOT, AND CONTROL METHOD OF MOTOR

(71) Applicant: SEIKO EPSON CORPORATION, Tokyo (JP)

(72) Inventor: Akitoshi Maeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/857,678

(22) Filed: Sep. 17, 2015

(65) Prior Publication Data

US 2016/0087564 A1    Mar. 24, 2016

(30) Foreign Application Priority Data

Sep. 19, 2014  (JP) ................................ 2014-190982
Jun. 5, 2015   (JP) ................................ 2015-114532

(51) Int. Cl.
*H02P 6/18* (2016.01)

(52) U.S. Cl.
CPC ..................................... *H02P 6/182* (2013.01)

(58) Field of Classification Search
CPC ............... H02P 6/08; H02P 6/142; H02P 6/15; H02P 6/18; H02P 6/182
USPC ........................ 318/400.34, 119, 685, 696, 400.32,318/400.12; 324/160–180; 361/236–244

See application file for complete search history.

(56) References Cited

U.S. PATENT DOCUMENTS

| 5,969,496 | A | 10/1999 | Yamada et al. | |
| 6,462,491 | B1* | 10/2002 | Iijima | H02P 9/18 318/400.09 |
| 6,483,270 | B1 | 11/2002 | Miyazaki et al. | |
| 7,294,982 | B2* | 11/2007 | Kurosawa | G11B 19/28 318/400.17 |
| 7,378,810 | B1* | 5/2008 | Sutardja | G11B 19/28 318/255 |
| 7,573,214 | B1* | 8/2009 | Sutardja | H02P 6/182 318/268 |
| 7,795,828 | B2* | 9/2010 | Proctor | H02P 6/182 318/400.09 |
| 7,885,521 | B2* | 2/2011 | Feinberg | A23L 1/0107 392/441 |
| 8,310,192 | B2* | 11/2012 | Bonvin | G11B 19/28 318/254.1 |
| 8,415,908 | B2* | 4/2013 | Galbiati | H02P 6/085 318/400.2 |

(Continued)

FOREIGN PATENT DOCUMENTS

JP   H11-018483 A   1/1999
JP   H11-089274 A   3/1999

(Continued)

*Primary Examiner* — Rita Leykin
(74) *Attorney, Agent, or Firm* — Maschoff Brennan

(57) ABSTRACT

A control device of a motor includes detection section that detect counter-electromotive voltages induced in coils by rotation of a rotor, a counter-electromotive voltage normalizing section that normalizes a value of the counter-electromotive voltage using a normalization coefficient according to a speed of the rotation of the rotor, and a rotor position specifying section that specifies the position of the rotor based on values of the counter-electromotive voltage normalized by the counter-electromotive voltage normalizing section.

7 Claims, 8 Drawing Sheets

(56) References Cited

U.S. PATENT DOCUMENTS

| | | | |
|---|---|---|---|
| 8,558,495 B2* | 10/2013 | Hong | H02P 6/182 |
| | | | 318/400.34 |
| 9,071,181 B2* | 6/2015 | Yersin | H02P 6/182 |
| 9,112,439 B2* | 8/2015 | Larsson | H02P 6/182 |
| 2001/0002784 A1 | 6/2001 | Masaki et al. | |
| 2012/0268052 A1* | 10/2012 | Nam | H02P 6/182 |
| | | | 318/494 |
| 2014/0152215 A1* | 6/2014 | DeFilippis | H02P 23/0004 |
| | | | 318/400.14 |
| 2014/0246998 A1* | 9/2014 | Chadsey | H02P 6/10 |
| | | | 318/400.06 |

FOREIGN PATENT DOCUMENTS

| | | |
|---|---|---|
| JP | 2001-169590 A | 6/2001 |
| JP | 2013-031294 A | 2/2013 |
| WO | 00/04632 A1 | 1/2000 |

* cited by examiner

FIRST CONVERSION TABLE

| Vb | X | X1 | X2 | ... | −X1 | −X |
|---|---|---|---|---|---|---|
| POSITION [DEGREE] | 45 | $\theta_{1,x1}$ | $\theta_{1,x2}$ | ... | $\theta_{1,-x1}$ | 135 |

FIG. 4

SECOND CONVERSION TABLE

| Va | X | X1 | X2 | ... | −X1 | −X |
|---|---|---|---|---|---|---|
| POSITION [DEGREE] | 135 | $\theta_{2,x1}$ | $\theta_{2,x2}$ | ... | $\theta_{2,-x1}$ | 225 |

FIG. 5

THIRD CONVERSION TABLE

| Vb | −X | −X1 | −X2 | ... | X1 | X |
|---|---|---|---|---|---|---|
| POSITION [DEGREE] | 225 | $\theta_{3,-x1}$ | $\theta_{3,-x2}$ | ... | $\theta_{3,x1}$ | 315 |

FIG. 6

FOURTH CONVERSION TABLE

| Va | −X | −X1 | −X2 | ... | X1 | X |
|---|---|---|---|---|---|---|
| POSITION [DEGREE] | 315 | $\theta_{4,-x1}$ | $\theta_{4,-x2}$ | ... | $\theta_{4,x1}$ | 45 |

FIG. 7

CONTROL DEVICE OF MOTOR, ELECTRONIC APPARATUS, RECORDING APPARATUS, ROBOT, AND CONTROL METHOD OF MOTOR

BACKGROUND

1. Technical Field

The present invention relates to a control device of a motor, an electronic apparatus, a recording apparatus, a robot, and a control method of a motor.

2. Related Art

A stepping motor is a synchronous motor that rotates a rotor by a magnetic flux which is generated by supplying an excitation current to a coil provided on a stator. Positioning control in which the rotational angle of the rotor is determined according to the number of an input pulse is easily performed in the stepping motor and the stepping motor is often driven by an open-loop control.

However, when driving at high speed or driving with a heavy load, deviation occurs between a target position (command position) and an actual position of the rotor, and then stepping out may occur.

Thus, in the stepping motor, in order to prevent stepping out, a feedback control may be executed based on a position of the rotor. A technique is disclosed in Pamphlet of International Publication No. 00/004632, in which positions (in other words, a position of the rotor) of the magnetic poles provided in the rotor are calculated based on a value of a counter-electromotive voltage induced in a coil by rotation of the rotor.

However, a magnitude (absolute value) of the counter-electromotive voltage induced in the coil by the rotation of the rotor is dependent on the speed of the rotor. Specifically, if the speed of the rotor is decreased, the counter-electromotive voltage is also decreased. Thus, if a rotational speed of the rotor is low, the counter-electromotive voltage is too small and the position of the rotor may not be appropriately calculated. As described above, precision of the calculation of the position of the rotor based on the value of the counter-electromotive voltage is not high.

Moreover, it is possible to specify the position of the rotor with high precision by providing a sensor that detects the position of the rotor. However, a configuration in which the sensor is provided is not preferable in view of the miniaturization or cost of the apparatus.

SUMMARY

An advantage of some aspects of the invention is to specify a position of a rotor at high precision based on a counter-electromotive voltage generated in a coil of a motor.

A control device of a motor according to one aspect of the invention is a control device of a motor that rotates a rotor by a magnetic flux generated by supplying an excitation current to a coil, the control device of a motor including: a detection section that detects a value of a counter-electromotive voltage induced in the coil by rotation of the rotor; a normalizing section that normalizes the value of the counter-electromotive voltage by using a normalization coefficient according to a speed of rotation of the rotor; and a specifying section that specifies a position of the rotor based on the value of the counter-electromotive voltage that is normalized.

According to this aspect, the position of the rotor is specified by the normalizing section based on the counter-electromotive voltage that is normalized according to the speed of the rotation of the rotor. Thus, it is possible to specify the position of the rotor with high precision and to perform feedback control based on the position of the rotor without providing a sensor (encoder) that detects the position of the rotor. Furthermore, it is possible to realize a so-called sensor-less motor unit by configuring the motor unit with the control device and the motor according to this aspect.

A control device of a motor according to another aspect of the invention is the control device of a motor according to the one aspect described above, in which the normalizing section normalizes the value of the counter-electromotive voltage by multiplying the normalization coefficient by the value of the counter-electromotive voltage induced in the coil, and a value of the normalization coefficient is decreased with an increase in the speed when the speed is greater than a predetermined value and is a constant value when the speed is less than the predetermined value.

According to this aspect, when the speed of the rotation of the rotor is greater than a predetermined value, the normalization coefficient is reduced as the speed is increased and when the speed of the rotation of the rotor is less than the predetermined value, the normalization coefficient is a constant value. The counter-electromotive voltage induced in the coil is increased in proportion to the speed of the rotation of the rotor. According to the aspect, it is possible to appropriately calculate the position of the rotor from the counter-electromotive voltage from a low speed range to a high speed range. Furthermore, if the speed of the rotation of the rotor is close to zero, the normalization coefficient originally diverges to infinity and becomes out of control. According to the aspect, since the normalization coefficient is a constant value when the speed of rotation of the rotor is less than the predetermined value, it is possible to perform control even if the speed of rotation of the rotor is less than the predetermined value.

A control device of a motor according to still another aspect of the invention is the control device of a motor according to the one aspect described above, which includes a table that stores the value of the counter-electromotive voltage that is normalized in association with the position of the rotor, and in which the specifying section specifies the position of the rotor corresponding to the counter-electromotive voltage that is normalized with reference to the table.

According to this aspect, since the specifying section specifies the position of the rotor with reference to the table storing the value of the counter-electromotive voltage that is normalized in association with the position of the rotor, the position of the rotor is specified with high precision from the low speed range to the high speed range.

An electronic apparatus according to one aspect of the invention includes the control device of a motor according to any of the aspects described above. According to this aspect, it is possible to provide the electronic apparatus that achieves the same effects as the control device of a motor according to any one of the aspects.

A recording apparatus according to one aspect of the invention includes the control device of a motor according to any of the aspects described above. According to this aspect, it is possible to provide the recording apparatus that achieves the same effects as the control device of a motor according to any one of the aspects.

A robot according to one aspect of the invention includes the control device of a motor according to any of the aspects described above. According to this aspect, it is possible to provide the robot that achieves the same effects as the control device of a motor according to any one of the aspects.

A control method of a motor according to one aspect of the invention is a control method of a motor that rotates a rotor by a magnetic flux generated by supplying an excitation current to a coil, the control method of a motor including: detecting a counter-electromotive voltage induced in the coil by rotation of the rotor; normalizing a value of the counter-electromotive voltage by using a normalization coefficient according to a speed of rotation of the rotor; and specifying a position of the rotor based on the value of the counter-electromotive voltage that is normalized.

According to this aspect, the position of the rotor is specified by the normalizing section based on the counter-electromotive voltage that is normalized according to the speed of the rotation of the rotor. Thus, it is possible to specify the position of the rotor with high precision and to perform feedback control based on the position of the rotor without using a sensor (encoder) to detect the position of the rotor. Furthermore, it is possible to realize a so-called sensor-less motor unit by employing a configuration for driving the motor with the control method according to this aspect.

BRIEF DESCRIPTION OF THE DRAWINGS

The invention will be described with reference to the accompanying drawings, wherein like numbers reference like elements.

FIG. 4 is a diagram illustrating a configuration example of a conversion table according to a first range.

FIG. 5 is a diagram illustrating a configuration example of a conversion table according to a second range.

FIG. 6 is a diagram illustrating a configuration example of a conversion table according to a third range.

FIG. 7 is a diagram illustrating a configuration example of a conversion table according to a fourth range.

DESCRIPTION OF EXEMPLARY EMBODIMENTS

Figure 1:
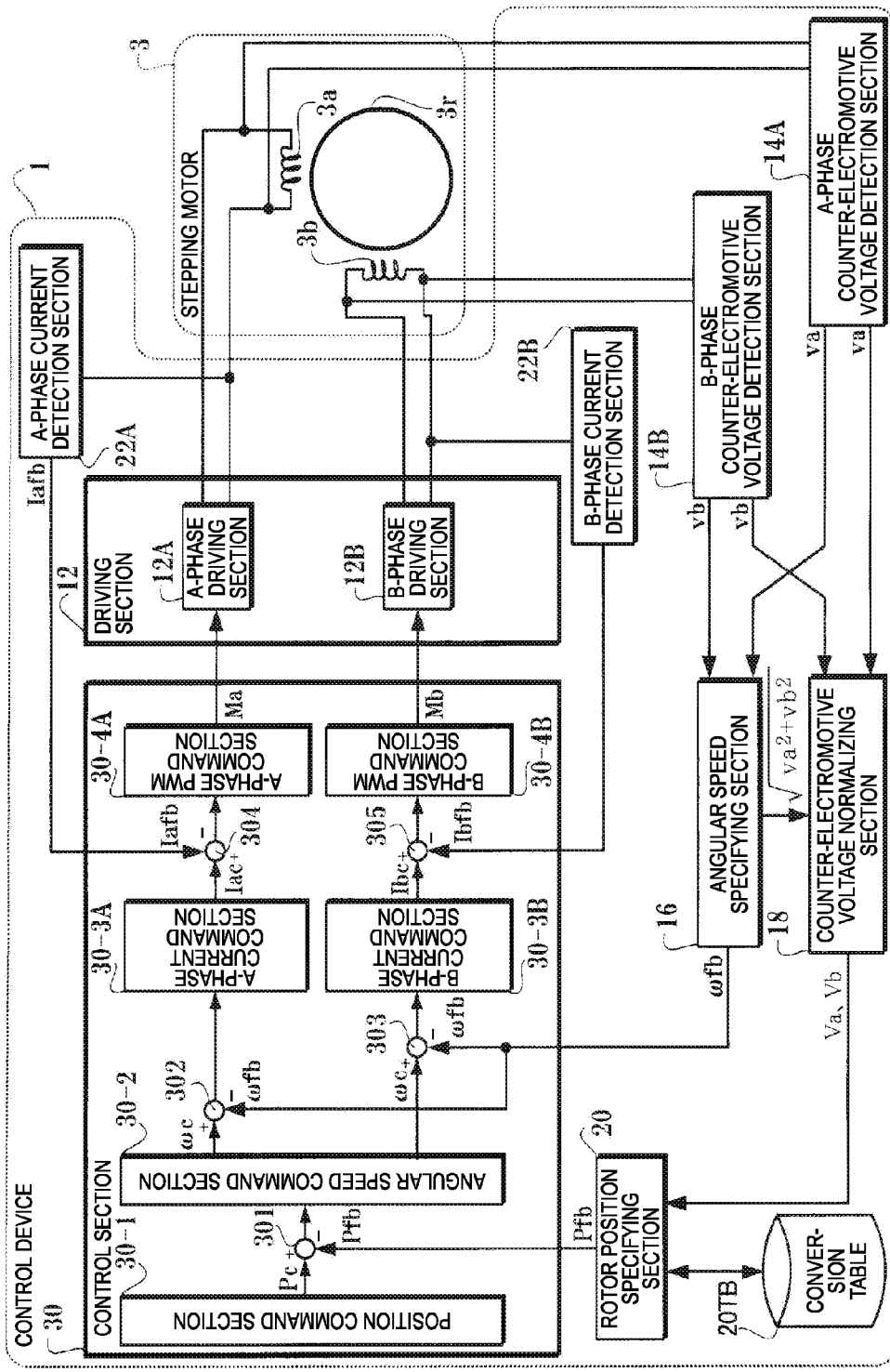
FIG. 1 is a diagram illustrating a configuration example of a control device of a motor according to an embodiment of the invention.

Hereinafter, a control device (hereinafter, simply referred to as "control device") of a motor and a control method according to an embodiment of the invention will be described. FIG. 1 is a diagram illustrating a configuration example of the control device of the motor according to the embodiment.

As illustrated in FIG. 1, a control device 1 according to the embodiment is a device for controlling drive of a stepping motor 3 as a motor. Moreover, a stepping motor unit is configured by integrally forming the control device 1 and the stepping motor 3 illustrated in FIG. 1.

The stepping motor 3 includes an A-phase stator coil (hereinafter, simply referred to as "A-phase coil") 3a, a B-phase stator coil (hereinafter, simply referred to as "B-phase coil") 3b, and a rotor 3r on which a rotary shaft (not illustrated) is mounted.

The stepping motor 3 is a so-called brushless motor. That is, a magnetic force is generated by supplying a predetermined drive current to the A-phase coil 3a and the B-phase coil 3b, and, for example, the rotor 3r that is a permanent magnet is rotated by the magnetic force.

Specifically, in the stepping motor 3, an excitation phase is switched and the rotor 3r is rotated by switching a coil through which the drive current flows. Then, if the same holding current continuously flows through the coils 3a and 3b without switching excitation phase, the rotor 3r is fixed to the same position and continuously holds a current position.

Moreover, in the embodiment, a two-phase type stepping motor 3 configured of an A-phase and a B-phase is used, but the configuration of the stepping motor 3 is not limited to the embodiment. For example, the number of phases of the stepping motor 3 is not limited to 2 phases and the stepping motor 3 may have a single phase, 3 phases, 4 phases, 5 phases, and the like. Furthermore, also the type of the rotor is not specifically limited and a Permanent Magnet (PM) type, a Variable Reluctance (VR) type, a Hybrid (HB) type, and the like can be used.

The control device 1 includes a driving section 12, an A-phase counter-electromotive voltage detection section 14A, a B-phase counter-electromotive voltage detection section 14B, an angular speed specifying section 16, a counter-electromotive voltage normalizing section 18, a rotor position specifying section 20, a counter-electromotive voltage-electrical angle conversion table (hereinafter, simply referred to as "conversion table") 20TB, an A-phase current detection section 22A, a B-phase current detection section 22B, and a control section 30.

Moreover, in the following description, if "value is input, output, and the like" is described, it means "a signal corresponding to the value is input and output".

The driving section 12 includes an A-phase driving section 12A and a B-phase driving section 12B.

The A-phase driving section 12A supplies a drive current according to a Pulse Width Modulation (PWM) command Ma output from the control section 30 to be described later to the A-phase coil 3a of the stepping motor 3.

The B-phase driving section 12B supplies a drive current according to the PWM command Mb output from the control section 30 to the B-phase coil 3b of the stepping motor 3.

The A-phase counter-electromotive voltage detection section 14A detects the counter-electromotive voltage induced to the A-phase coil 3a by rotation of the rotor 3r and supplies a value of the A-phase counter-electromotive voltage va that is Analog-to-Digital (AD)-converted to the angular speed specifying section 16 and the counter-electromotive voltage normalizing section 18.

The B-phase counter-electromotive voltage detection section 14B detects the counter-electromotive voltage induced to the B-phase coil 3b by rotation of the rotor 3r and supplies a value of the B-phase counter-electromotive voltage vb that is AD-converted to the angular speed specifying section 16 and the counter-electromotive voltage normalizing section 18.

The angular speed specifying section 16 specifies a speed vel of the rotor 3r from the A-phase counter-electromotive voltage va and the B-phase counter-electromotive voltage vb, and supplies a detection result to the counter-electromotive voltage normalizing section 18 and the control section 30. Specifically, the speed vel is obtained by the following (Expression 1).

$$vel = \sqrt{va^2 + vb^2} \quad \text{(Expression 1)}$$

The angular speed specifying section 16 supplies a specified value of the speed vel to the counter-electromotive voltage normalizing section 18. Furthermore, the angular speed specifying section 16 supplies the specified value of the speed vel to the control section 30 as an angular speed feedback value ωfb.

The counter-electromotive voltage normalizing section 18 normalizes values of the A-phase counter-electromotive voltage va and the B-phase counter-electromotive voltage vb. Specifically, the counter-electromotive voltage normalizing section 18 normalizes the A-phase counter-electromotive voltage va and the B-phase counter-electromotive voltage vb respectively by the following (Expression 2) and (Expression 3) using the normalization coefficient calculation function Calc_K (vel) that is a function of the speed vel. Hereinafter, the A-phase counter-electromotive voltage va that is normalized is indicated as Va and the B-phase counter-electromotive voltage vb that is normalized is indicated as Vb.

$$Va = va \cdot \text{Calc } K(vel) \quad \text{(Expression 2)}$$

$$Vb = vb \cdot \text{Calc } K(vel) \quad \text{(Expression 3)}$$

Then, both the A-phase counter-electromotive voltage Va and the B-phase counter-electromotive voltage Vb are values in a range of −n to n (n is a natural number).

Figure 2:
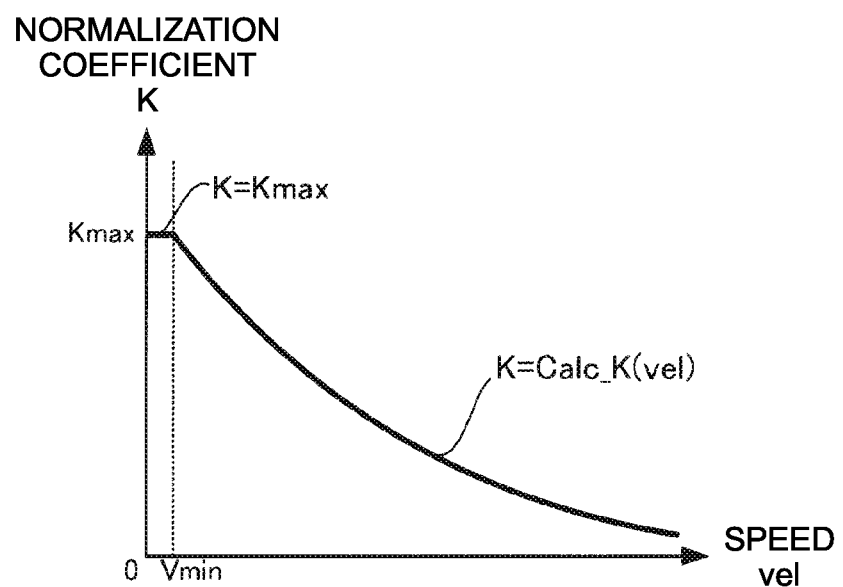
FIG. 2 is a graph describing a normalization coefficient calculation function Calc_K.

Hereinafter, the normalization coefficient calculation function Calc_K will be described in detail. FIG. 2 is a graph describing the normalization coefficient calculation function Calc_K. In the view, a horizontal axis indicates the speed vel and a vertical axis indicates a normalization coefficient K.

When the speed vel is a predetermined lower limit speed Vmin or greater, the speed vel is substantially inversely proportional to the normalization coefficient K. That is, as illustrated in FIG. 2, the normalization coefficient calculation function K=Calc_K (vel) indicating the relationship between the speed vel and the normalization coefficient K is indicated by a curve in which the normalization coefficient K is decreased inversely proportionally to an increase in the speed vel. On the other hand, when the speed vel is less than the lower limit speed Vmin, the normalization coefficient K becomes a constant value Kmax.

Moreover, as an example of the normalization coefficient calculation function Calc_K (vel) when the speed vel is the lower limit speed Vmin or greater, for example, 1/vel can be exemplified.

Information indicating the A-phase counter-electromotive voltage va and the B-phase counter-electromotive voltage vb that are normalized by the process described above is supplied to the rotor position specifying section 20.

However, the control device of the related art driving the stepping motor includes an encoder for detecting the rotational angle (position) of the rotor and a count section for counting a number of pulses output from the encoder, and specifies the position (electrical angle) of the rotor from a count value obtained by the count section.

On the other hand, the control device 1 according to the embodiment does not include an encoder and a count section. That is, the stepping motor unit configured of the control device 1 according to the embodiment and the stepping motor 3 is a so-called sensor-less motor unit.

Specifically, in the embodiment, the position of the rotor 3r is specified by using the a value of the A-phase counter-electromotive voltage Va that is normalized, a value of the B-phase counter-electromotive voltage Vb that is normalized, and the conversion table 20TB instead of specifying the position of the rotor from the number of pulses output from the encoder. Hereinafter, detailed description will be given.

Figure 3:
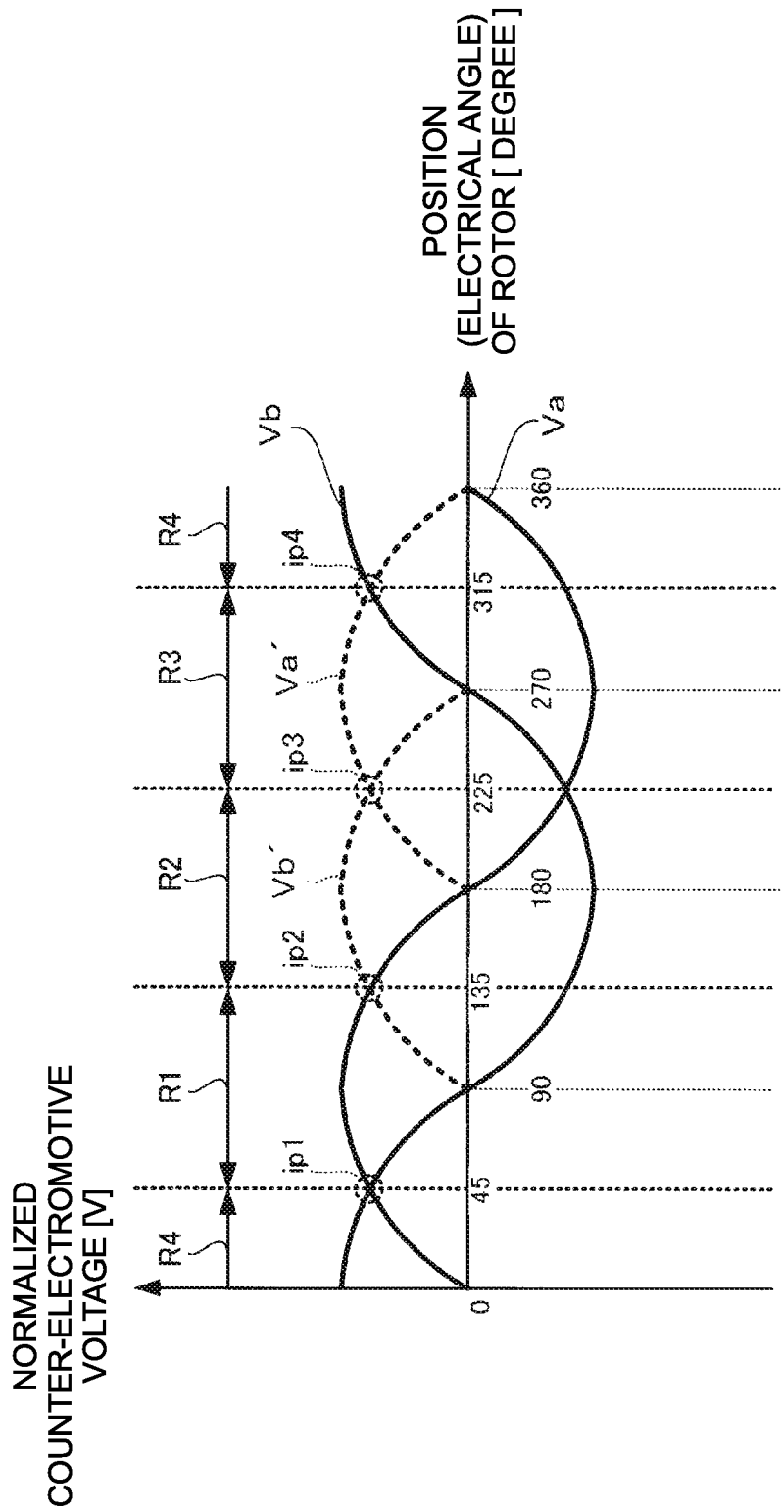
FIG. 3 is a graph illustrating an example of a relationship between values of an A-phase counter-electromotive voltage and a B-phase counter-electromotive voltage that are normalized, and a position (electrical angle) of a rotor.

FIG. 3 is a graph illustrating a relationship between the A-phase counter-electromotive voltage Va and the B-phase counter-electromotive voltage Vb that are normalized, and the position (electrical angle) of the rotor 3r. In the graph indicated in the same view, a horizontal axis indicates the position (electrical angle θe) [degree] of the rotor 3r and a vertical axis indicates a voltage value [V].

Furthermore, in the same view, a waveform Va' indicated by a broken line is a waveform formed by replacing a negative value of the A-phase counter-electromotive voltage Va with a positive value of the same size. Similarly, in the same view, a waveform Vb' indicated by a broken line is a waveform formed by replacing a negative value of the B-phase counter-electromotive voltage Vb with a positive value of the same size.

A magnitude relationship between an absolute value of the A-phase counter-electromotive voltage Va and an absolute value of the B-phase counter-electromotive voltage Vb is easily considered at angles where the A-phase counter-electromotive voltage Va or the B-phase counter-electromotive voltage Vb becomes the negative values with reference to the waveforms Va' and Vb'.

As illustrated in FIG. 3, a graph indicating the absolute value of the A-phase counter-electromotive voltage Va and a graph indicating the absolute value of the B-phase counter-electromotive voltage Vb have four intersecting points ip1 to ip4 within a range of the position of the rotor 3r from 0 [degrees] to 360 [degrees].

In the embodiment, dividing is performed as follows with reference to the four intersecting points ip1 to ip4 such that the position of the rotor 3r is specified from the value of one of the A-phase counter-electromotive voltage Va and the B-phase counter-electromotive voltage Vb.

That is, a range of the positions of the rotor 3r corresponding to a first intersecting point ip1 to a second intersecting point ip2 is "first range R1", a range of the positions of the rotor 3r corresponding to the second intersecting point ip2 to a third intersecting point ip3 is "second range R2", a range of the positions of the rotor 3r corresponding to the third intersecting point ip3 to a fourth intersecting point ip4 is "third range R3", and a range of the position of the rotor 3r corresponding to the forth intersecting point ip4 to the first intersecting point ip1 is "fourth range R4".

Then, each range of the first range R1 to the fourth range R4 configures a table in association with the values of the A-phase counter-electromotive voltage Va or the B-phase counter-electromotive voltage Vb and the position of the rotor 3r. That is, the conversion table 20TB is configured of a first conversion table to a fourth conversion table.

Hereinafter, the first range R1 to the fourth range R4 and the first conversion table to the fourth conversion table will be described in detail.

First Range R1

The first range R1 is a range satisfying |Vb|≤|Va| and Vb≤Va. In an example illustrated in FIG. 3, the first range R1 is a range of the position of the rotor 3r from 45 [degrees] to 135 [degrees].

In the first range R1, the value of the B-phase counter-electromotive voltage Vb monotonically decreases. Thus, in the first range, as illustrated in FIG. 4, the B-phase counter-electromotive voltage Vb of which a range of a change in the counter-electromotive voltage is greater than that of the A-phase counter-electromotive voltage Va is employed as a parameter of the first conversion table. Thus, it is possible to allocate the counter-electromotive voltage of a wide range to a range from 45 [degrees] to 135 [degrees] compared to a case where the A-phase counter-electromotive voltage Va is employed as the parameter of the first conversion table. As a result, it is possible to improve resolution.

Second Range R2

The second range R2 is a range satisfying |Vb|≤|Va| and Vb≤Va. In the example illustrated in FIG. 3, the second range R2 is a range of the position of the rotor 3r from 135 [degrees] to 225 [degrees].

In the second range R2, the value of the A-phase counter-electromotive voltage Va monotonically decreases. Thus, in the second range R2, as illustrated in FIG. 5, the A-phase counter-electromotive voltage Va of which linearity of a change is higher than that of the B-phase counter-electromotive voltage Vb is employed as a parameter of the second conversion table. Thus, it is possible to allocate the counter-electromotive voltage of a wide range to a range from 135 [degrees] to 225 [degrees] compared to a case where the B-phase counter-electromotive voltage Vb is employed as the parameter of the second conversion table. As a result, it is possible to improve the resolution.

Third Range R3

The third range R3 is a range satisfying |Vb|≤|Va| and Va≤Vb. In the example illustrated in FIG. 3, the third range R3 is a range of the position of the rotor 3r from 225 [degrees] to 315 [degrees].

In the third range R3, the value of the B-phase counter-electromotive voltage Vb monotonically decreases. Thus, in the third range R3, as illustrated in FIG. 6, the B-phase counter-electromotive voltage Vb of which linearity of a change is higher than that of the A-phase counter-electromotive voltage Va is employed as a parameter of the third conversion table. Thus, it is possible to allocate the counter-electromotive voltage of a wide range to a range from 225 [degrees] to 315 [degrees] compared to a case where the A-phase counter-electromotive voltage Va is employed as the parameter of the third conversion table. As a result, it is possible to improve the resolution.

Fourth Range R4

The fourth range R4 is a range satisfying |Vb|≤|Va| and Va≤Vb. In the example illustrated in FIG. 3, the fourth range R4 is a range of the position of the rotor 3r from 315 [degrees] to 360 [degrees] and from 0 [degree] to 45 [degrees].

In the fourth range R4, the value of the A-phase counter-electromotive voltage Va monotonically increases. Thus, in the fourth range R4, as illustrated in FIG. 7, the A-phase counter-electromotive voltage Va of which linearity of a change is higher than that of the B-phase counter-electromotive voltage Vb is employed as a parameter of the fourth conversion table. Thus, it is possible to allocate the counter-electromotive voltage of a wide range to a range from 315 [degrees] to 360 [degrees] and from 0 [degree] to 45 [degrees] compared to a case where the B-phase counter-electromotive voltage Vb is employed as the parameter of the fourth conversion table. As a result, it is possible to improve the resolution.

As described above, the conversion table 20TB is formed of the first conversion table to the fourth conversion table and each conversion table stores the value of the A-phase counter-electromotive voltage Va or the B-phase counter-electromotive voltage Vb which is normalized, and the position (electrical angle θe) of the rotor 3r in association with each other.

According to the conversion table 20TB, it is possible to specify the position (electrical angle θe) of the rotor 3r based on an output of the counter-electromotive voltage normalizing section 18, that is, the value of the A-phase counter-electromotive voltage Va or the B-phase counter-electromotive voltage Vb which is normalized.

Description is returned to FIG. 1. The rotor position specifying section 20 specifies the position (electrical angle θe) of the rotor 3r from the value of the A-phase counter-electromotive voltage Va or the B-phase counter-electromotive voltage Vb supplied from the counter-electromotive voltage normalizing section 18 and the conversion table 20TB formed of the first conversion table to the fourth conversion table.

First, the rotor position specifying section 20 determines a magnitude relationship between |Va| and |Vb| from the values of the A-phase counter-electromotive voltage Va and the B-phase counter-electromotive voltage Vb supplied from the counter-electromotive voltage normalizing section 18, and a magnitude relationship between the Va and the Vb, and determines which one of the first range R1 to the fourth range R4 these values correspond to. Subsequently, the rotor position specifying section 20 specifies the position of the rotor 3r corresponding to the value of the A-phase counter-electromotive voltage Va or the B-phase counter-electromotive voltage Vb supplied from the counter-electromotive voltage normalizing section 18 with reference to the conversion table (conversion table of the corresponding range) according to the determination result.

The rotor position specifying section 20 supplies a position feedback value Pfb indicating the position (electrical angle θe) of the rotor 3r that is specified to the control section 30.

The A-phase current detection section 22A detects a current flowing through the A-phase coil 3a of the stepping motor 3 and supplies the detected value to the control section 30 as an A-phase current feedback value Iafb.

The B-phase current detection section 22B detects a current flowing through the B-phase coil 3b of the stepping motor 3 and supplies the detected value to the control section 30 as a B-phase current feedback value Ibfb.

The control section 30 includes a position command section 30-1, an angular speed command section 30-2, an A-phase current command section 30-3A, a B-phase current command section 30-3B, an A-phase PWM command section 30-4A, a B-phase PWM command section 30-4B, a subtractor 301, a subtractor 302, a subtractor 303, a subtractor 304, and a subtractor 305.

The position command section 30-1 outputs a signal indicating a target value of the position of the rotor 3r as a position command Pc. The position command Pc is input from the position command section 30-1 and a feedback value Pfb is input from the rotor position specifying section 20 into the subtractor 301.

The subtractor 301 calculates a deviation (in other words, a value that is obtained by subtracting the position feedback value Pfb from the target value of the angular speed of the rotor 3r) between the position command Pc and the position feedback value Pfb.

The angular speed command section 30-2 calculates the target value of the angular speed of the stepping motor 3 according to the deviation by performing a predetermined calculating process using the deviation calculated by the subtractor 301, a position proportional gain that is a predetermined coefficient, and the like. Then, the angular speed command section 30-2 outputs the signal indicating the target value (command value) thereof to the subtractors 302 and 303 as an angular speed command ωc.

The angular speed command ωc is input and an angular speed feedback value ωfb is input into the subtractors 302 and 303. The subtractors 302 and 303 calculate a deviation (value that is obtained by subtracting the angular speed feedback value ωfb from the target value of angular speed of the rotor 3r) between the angular speed command ωc and the angular speed feedback value ωfb.

The A-phase current command section 30-3A generates a signal (A-phase current command Iac) indicating a field magnetic current of the A-phase coil 3a according to the deviation by performing a predetermined calculating process including integration using the deviation input from the subtractor 302, an angular speed proportional gain that is a predetermined coefficient, an angular speed integral gain, and the like. Then the A-phase current command section 30-3A outputs the signal to the subtractor 304.

The B-phase current command section 30-3B generates a signal (B-phase current command Ibc) indicating a field magnetic current of the B-phase coil 3b according to the deviation by performing a predetermined calculating process including integration using the deviation input from the subtractor 303, the angular speed proportional gain that is a predetermined coefficient, the angular speed integral gain, and the like. Then the B-phase current command section 30-3B outputs the signal to the subtractor 305.

The A-phase current command Iac is input and the A-phase current feedback value Iafb is input into the subtractor 304. The subtractor 304 calculates a deviation (in other words, a value that is obtained by subtracting the A-phase current feedback value Iafb from the target value of the field magnetic current of the A-phase coil 3a) between the A-phase current command Iac and the A-phase current feedback value Iafb.

The B-phase current command Ibc is input and the B-phase current feedback value Ibfb is input into the subtractor 305. The subtractor 305 calculates a deviation (in other words, a value that is obtained by subtracting the B-phase current feedback value Ibfb from the target value of the field magnetic current of the B-phase coil 3b) between the B-phase current command Ibc and the B-phase current feedback value Ibfb.

The A-phase PWM command section 30-4A generates a PWM command Ma for controlling the A-phase driving section 12A based on the deviation input from the subtractor 304 such that an effective value of the current flowing through the A-phase coil 3a becomes the target value according to the A-phase current command, and outputs the PWM command Ma. Then, as described above, the A-phase driving section 12A supplies a driving current according to the PWM command Ma to the A-phase coil 3a.

The B-phase PWM command section 30-4B generates a PWM command Mb for controlling the B-phase driving section 12B based on the deviation input from the subtractor 305 such that an effective value of the current flowing through the B-phase coil 3b becomes the target value according to the B-phase current command, and outputs the PWM command Mb. Then, as described above, the B-phase driving section 12B supplies a driving current according to the PWM command Mb to the B-phase coil 3b.

In the control by the control device 1 described above, a predetermined driving current is supplied to the A-phase coil 3a and the B-phase coil 3b of the stepping motor 3, and thereby the rotor 3r rotates. Thus, the feedback control is performed and the driving current of the stepping motor 3 is controlled such that the position feedback value Pfb is equal to the position command Pc as much as possible and the angular speed feedback value ωfb is equal to the angular speed command ωc as much as possible.

As described above, according to the control device 1 and the control method according to the embodiment, it is possible to calculate the position (electrical angle θe) of the rotor 3r with high precision based on the counter-electromotive voltage generated in the coils 3a and 3b of the stepping motor 3 without providing a sensor (encoder and the like) detecting the position of the rotor 3r.

Electronic Apparatus

Hereinafter, an example of an electronic apparatus to which the control device 1 and the stepping motor 3 described above are applied will be described.

Laser Scanner Apparatus

Figure 8:
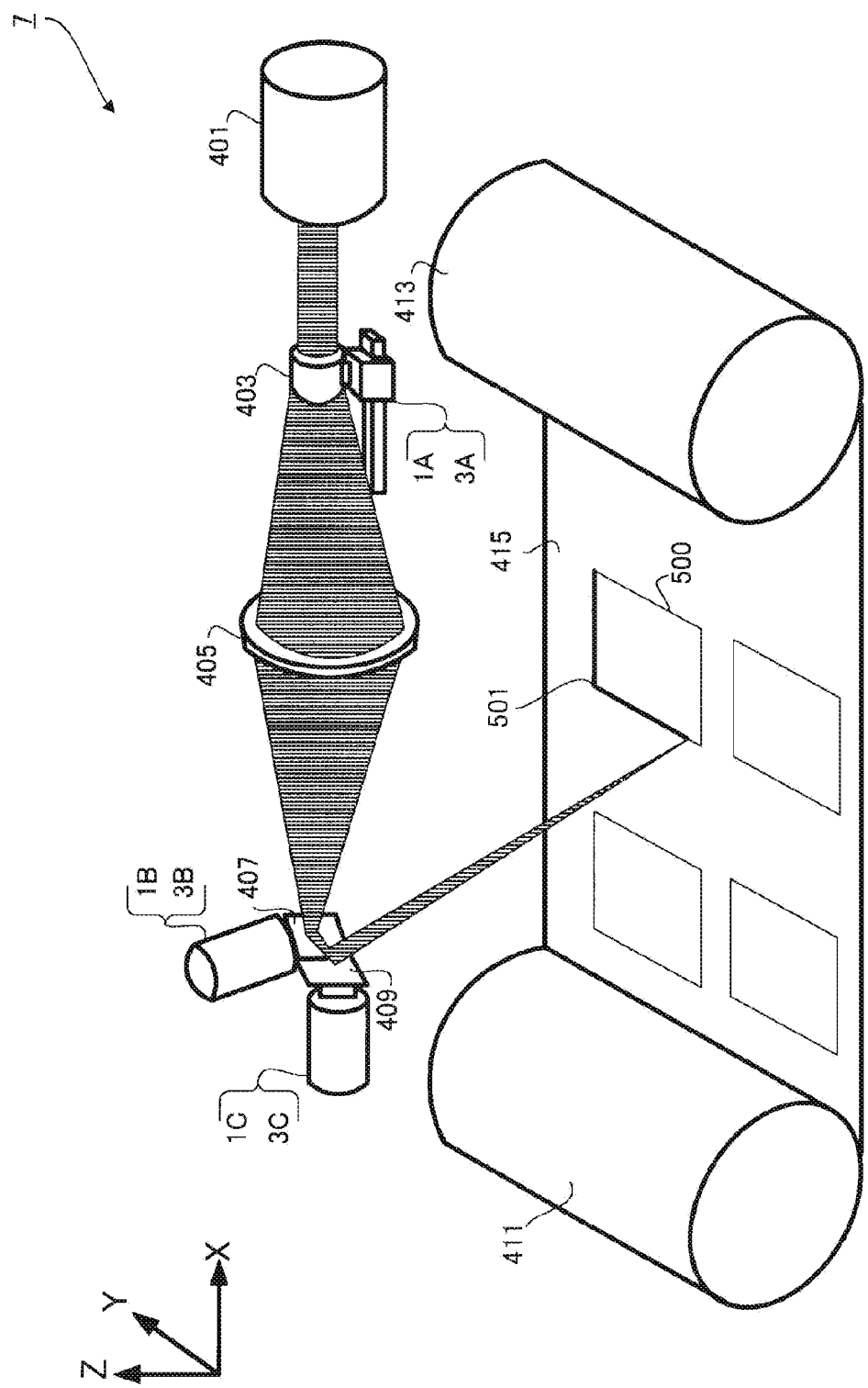
FIG. 8 is a view illustrating a configuration example of a laser scanner apparatus as an example of an electronic apparatus to which the control device of the motor according to the embodiment of the invention is applied.

First, as an example of an electronic apparatus to which the control device 1 and the stepping motor 3 described above are applied, a laser scanning apparatus (laser scanner apparatus) will be described. FIG. 8 is a view illustrating a configuration example of a laser scanner apparatus 7 to which the control device 1 of the motor and the stepping motor 3 according to the embodiment described above is applied. The laser scanner apparatus 7 can be used for cutting a printed matter such as a label in a recording apparatus described later. Moreover, in the description of the laser scanner apparatus 7, the stepping motor 3 described above is described as the stepping motors 3A, 3B, and 3C.

The laser scanner apparatus 7 includes a laser oscillator 401, a first lens 403, a second lens 405, a first mirror 407, a second mirror 409, the stepping motor 3A, a control device 1A that performs control of the stepping motor 3A, the stepping motor 3B, a control device 1B that performs control of the stepping motor 3B, the stepping motor 3C, and a control device 1C that performs control of the stepping motor 3C.

A workpiece 415 is wound by a transport body 413 while being sent by rotation of a transport body 411.

If the laser oscillator 401 oscillates a laser light, the laser light is incident on the first lens 403, is refracted, and is incident on the second lens 405. The second lens 405 injects the incident light so as to converge at a point on the workpiece 415. The light injected from the second lens 405 is reflected by the first mirror 407 and the second mirror 409, and is incident on the workpiece 415.

The first lens 403 is capable of moving in a moving direction (X axis direction) of the workpiece by the transport bodies 411 and 413, and is held by a first holding member (not illustrated). Then, a driving force of the stepping motor 3A controlled by the control device 1A is transmitted to a holding member (not illustrated) by a first driving force transmitting mechanism (not illustrated), and then the first lens 403 moves.

The first mirror 407 is held by a second holding member (not illustrated) to be capable of rotating in a predetermined direction. Then, a driving force of the stepping motor 3B that is controlled by the control device 1B is transmitted to the second holding member (not illustrated) by a second driving force transmitting mechanism (not illustrated), and then the first mirror 407 rotates. An incident angle and an exit angle of the light incident on the first mirror 407 are changed by the rotation.

The second mirror 409 is held by a third holding member (not illustrated) to be capable of rotating in a predetermined direction. Then, a driving force of the stepping motor 3C that is controlled by the control device 1C is transmitted to the third holding member (not illustrated) by a third driving force transmitting mechanism (not illustrated), and then the second mirror 409 rotates. An incident angle and an exit angle of the light incident on the second mirror 409 are changed by the rotation.

Then, it is possible to apply the laser light to a predetermined position on the workpiece 415 by controlling each of the stepping motor 3A, 3B, and 3C by each of the control devices 1A, 1B, and 1C. Thus, as illustrated in FIG. 8, it is possible to apply the laser light on a workpiece line 500 indicating a predetermined position of laser machining. In the same view, a line to which a reference numeral 501 is added indicates a position where machining is completed by applying the laser light.

According to the laser scanner apparatus 7 described above, it is possible to control the position (electrical angle $\theta e$) of the rotor of the stepping motors 3A, 3B, and 3C for controlling an irradiation position of the laser light with high precision. That is, the stepping motors 3A, 3B, and 3C can calculate the position (electrical angle $\theta e$) of the rotor with high precision based on the counter-electromotive voltage generated by the coils the stepping motors 3A, 3B, and 3C without providing a sensor (encoder and the like) detecting the position of the rotor. Thus, the laser scanner apparatus 7 having the configuration can radiate the laser light with further high position precision.

Robot

Next, a robot to which the control device 1 and the stepping motor 3 described above are applied will be described. Moreover, as an example of the robot, hereinafter, a vertical articulated robot (6 axes) is illustrated, but as the robot, the robot is not limited to the example and may be a dual-arm robot and other axes robot. Moreover, in the detection of the laser scanner apparatus 7, the stepping motor 3 described above is described as stepping motors 3E, 3F, 3G, 3H, 3I, and 3J.

Figure 9:
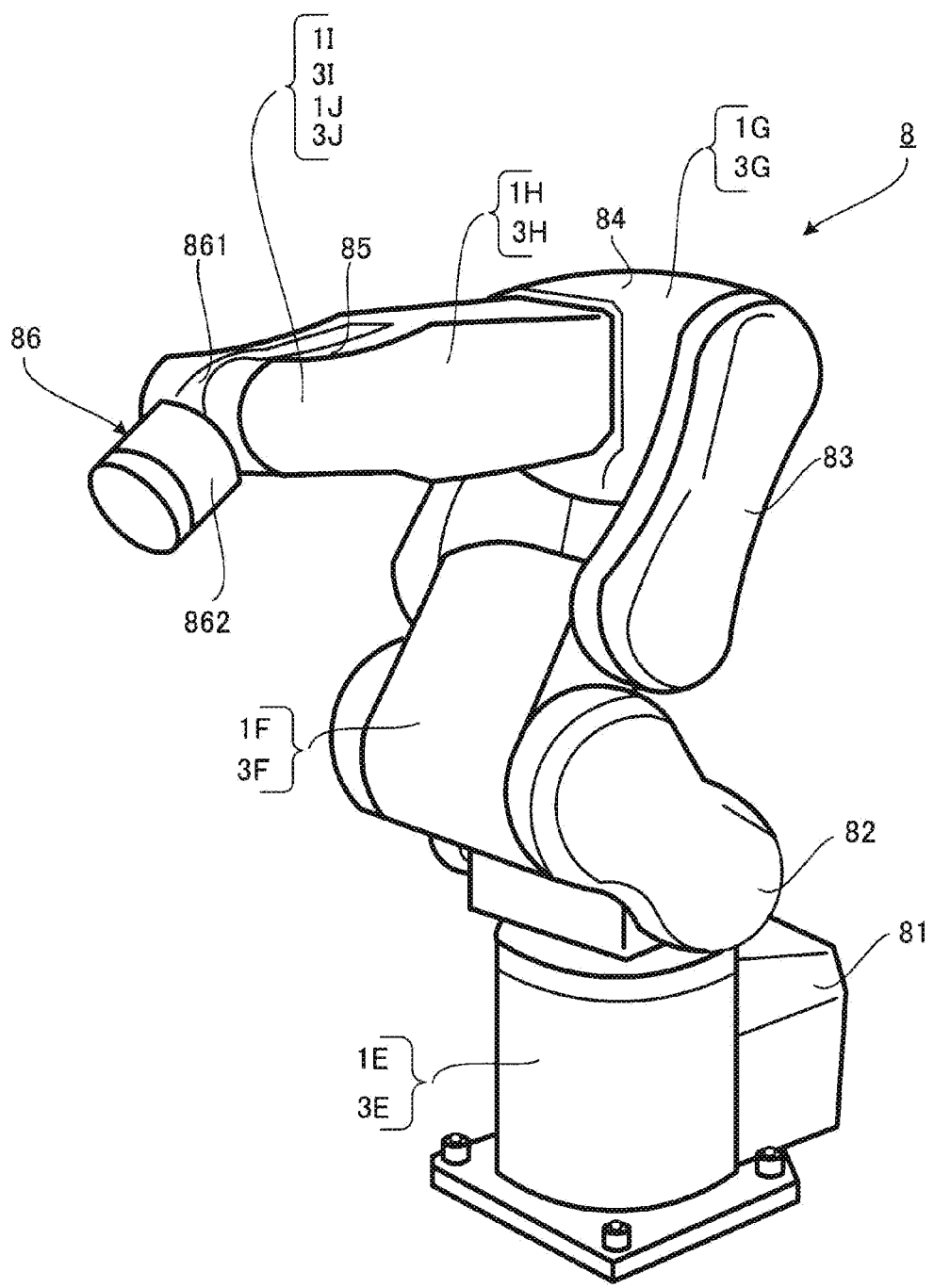
FIG. 9 is an external perspective view of a vertical articulated (6 axes) robot as an example of an electronic apparatus to which the control device of the motor according to the embodiment of the invention is applied.

A robot 8 illustrated in FIG. 9 is the vertical articulated robot. Such the robot 8 includes a base 81, four arms 82, 83, 84, and 85, and a wrist 86, and these members are connected in order.

For example, the base 81 is fixed to a floor surface (not illustrated) by bolts and the like. The arm 82 is connected to an upper end portion of the base 81 in an inclined posture with respect to a horizontal direction and the arm 82 is capable of rotating around a rotational axis along the vertical direction with respect to the base 81. Furthermore, the stepping motor 3E that rotates the arm 82 and a control device 1E that performs control of the stepping motor 3E are disposed inside the base 81.

The arm 83 is connected to a tip end portion of the arm 82 and the arm 83 is capable of rotating around the rotational axis along the horizontal direction with respect to the arm 82. Furthermore, the stepping motor 3F that rotates the arm 83 with respect to the arm 82 and a control device 1F that performs control of the stepping motor 3F are disposed inside the arm 83.

The arm 84 is connected to a tip end portion of the arm 83 and the arm 84 is capable of rotating around the rotational axis along the horizontal direction with respect to the arm 83. Furthermore, the stepping motor 3G that rotates the arm 84 with respect to the arm 83 and a control device 1G that performs control of the stepping motor 3G are disposed inside the arm 84.

The arm 85 is connected to a tip end portion of the arm 84 and the arm 85 is capable of rotating around the rotational axis along a center shaft of the arm. 84 with respect to the arm 84. Furthermore, the stepping motor 3H that rotates the arm 85 with respect to the arm 84 and a control device 1H that performs control of the stepping motor 3H are disposed inside the arm 85.

The wrist 86 is connected to a tip end portion of the arm 85. The wrist 86 has a ring-shaped support ring 861 connected to the arm 85 and a cylindrical wrist body 862 supported by a tip end portion of the support ring 861. A tip end surface of the wrist body 862 is a flat surface and, for example, is a mounting surface on which a manipulator for gripping a precision apparatus such as a wristwatch is mounted.

The support ring 861 is capable of rotating around a rotational axis along the horizontal direction with respect to the arm 85. Furthermore, the wrist body 862 is capable of rotating around a rotational axis along a center shaft of the wrist body 862 with respect to the support ring 861. The stepping motor 3I that rotates the support ring 861 with respect to the arm 85, a control device 1I that performs control of the stepping motor 3I, the stepping motor 3J that rotates the wrist body 862 with respect to the support ring 861, and a control device 1J that performs control of the stepping motor 3J are disposed inside the arm 85. Driving forces of the stepping motors 3I and 3J are respectively transmitted to the support ring 861 and the wrist body 862 by a driving force transmitting mechanism (not illustrated).

According to the robot 8 described above, it is possible to control positions (electrical angle $\theta e$) of rotors of the stepping motors 3E, 3F, 3G, 3H, 3I, and 3J for controlling rotation positions of the four arms 82, 83, 84, and 85, and the wrist 86 with high precision. That is, the stepping motors 3E, 3F, 3G, 3H, 3I, and 3J can calculate the positions (electrical angle $\theta e$) of the rotors with high precision based on the counter-electromotive voltage generated in coils of the stepping motors 3E, 3F, 3G, 3H, 3I, and 3J without providing a sensor (encoder and the like) detecting the positions of the rotors. Thus, the robot 8 can move the wrist 86 to a desired position with further high position precision or rotation precision.

As described above, as the electronic apparatus including the control device 1 and the stepping motor 3, the laser scanner apparatus 7 and the robot 8 are exemplified, but an NC machine, a 3D printer, and the like are also a kind of the electronic apparatus.

Recording Apparatus

Hereinafter, an example of a recording apparatus including the control device 1 and the stepping motor 3 described above will be described. Moreover, in the configuration, a configuration using the laser scanner apparatus 7 described above to which the control device 1 and the stepping motor 3 are applied is exemplified. Thus, in the following description, the same reference numerals are given to the same configurations of the laser scanner apparatus 7 described above, and the description will be simplified or omitted.

Furthermore, in the following each view, in order to make each layer or each member big to be recognizable, a scale of each layer or each member is illustrated different from an actual scale.

First Configuration Example of Recording Apparatus

Figure 10:
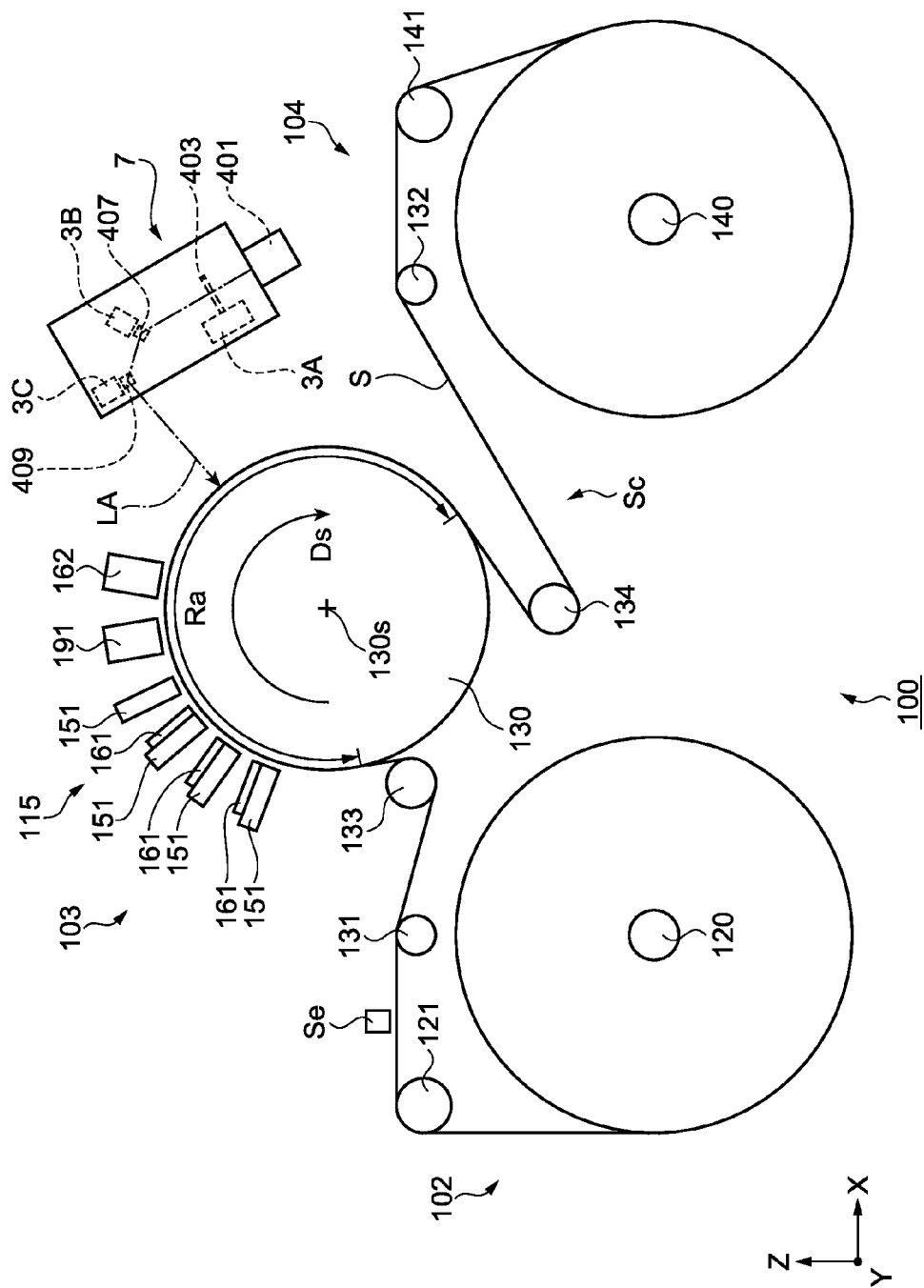
FIG. 10 is an external front view schematically illustrating a first configuration example of a recording apparatus including the control device of the motor according to the embodiment of the invention.

First, as a first the configuration example of the recording apparatus including the control device 1 and the stepping motor 3 described above, an image recording apparatus 100 that is a label printing apparatus including a drum type platen will be described. FIG. 10 is a front view schematically illustrating the first configuration example of the recording apparatus including the laser scanner apparatus 7 to which the control device 1 of the motor and the stepping motor 3 according to the embodiment are applied.

As illustrated in FIG. 10, in the image recording apparatus 100, one sheet S (web) as a recording medium, of which both ends are wound on a feeding shaft 120 and a winding shaft 140 in a roll shape, is stretched between the feeding shaft 120 and the winding shaft 140, and the sheet S is transported from the feeding shaft 120 to the winding shaft 140 along a transport path Sc that is stretched. Then, the recording apparatus 100 is configured to record (form) an image on the sheet S by ejecting a functional liquid on the sheet S transported along the transport path Sc. Moreover, the sheet S is not specifically limited. A paper-based structure, a film-base structure, or the like, or a multi-layer structure (for example, substrate of seal strip) that is formed by bonding the paper-based structure or the film-base structure in multi-layer can be applied. For example, the paper-based structure includes a fine paper, a cast paper, an art paper, a coated paper, and the like and the film-based structure includes a synthetic paper, Polyethylene terephthalate (PET), Polypropylene (PP), and the like.

As a schematic configuration, the image recording apparatus 100 is configured to include a feeding section 102 that feeds the sheet S from the feeding shaft 120, a processing section 103 that records the image on the sheet S fed from the feeding section 102, the laser scanner apparatus 7 that cuts the sheet S on which the image is recorded by the processing section 103, and a winding section 104 that winds the sheet S on the winding shaft 140. Moreover, in the following description, a surface on which the image is recorded may be referred to as a front surface and a surface opposite thereto may be referred to as a rear surface in both surfaces of the sheet S.

The feeding section 102 has the feeding shaft 120 on which the end of the sheet S is wound and a driven roller 121 on which the sheet S drawn from the feeding shaft 120 is wound. The feeding shaft 120 winds and supports the end of the sheet S in a state where the front surface of the sheet S is directed toward the outside. Then, the feeding shaft 120 rotates in the clockwise direction of FIG. 10 and thereby the sheet S wound on the feeding shaft 120 is fed to the processing section 103 via the driven roller 121. In addition, the sheet S is wound on the feeding shaft 120 through a core tube (not illustrated) that is mounted on the feeding shaft 120 to be removable. Thus, when the sheet S of the feeding shaft 120 is used up, it is possible to replace the sheet S of the feeding shaft 120 by mounting a new core tube on the feeding shaft 120 on which the roll-shaped sheet S is wound.

The processing section 103 performs an appropriate process by a recording head 151 disposed in a head unit 115 that is disposed along an outer peripheral surface of a platen drum 130 and the like while supporting the sheet S fed out from the feeding section 102 by the platen drum 130 as a support section. Then, the processing section 103 records the image on the sheet S.

The platen drum 130 is a cylindrical drum that is supported to be rotatable around a drum shaft 130s by a support mechanism (not illustrated). In addition, the platen drum 130 winds the sheet S transported from the feeding section 102 to the winding section 104 from the rear surface side thereof. The platen drum 130 supports the sheet S from the rear surface side while being driven to be rotated in a transport direction Ds of the sheet S by receiving a friction force between the platen drum 130 and the sheet S. In addition, driven rollers 133 and 134, which turn the sheet S on both sides of the winding section of the platen drum 130, is provided in the processing section 103. The driven roller 133 thereof turns the sheet S by winding the front surface of the sheet S between the driven roller 121 and the platen drum 130. Meanwhile, the driven roller 134 turns the sheet S by winding the front surface of the sheet S between the platen drum 130 and a driven roller 141. As described above, it is possible to secure a length of a winding portion Ra of the sheet S on the platen drum 130 to be long by turning the sheet S on an upstream side and a downstream side in the transport direction Ds with respect to the platen drum 130. Moreover, another driven roller 131 or an edge sensor Se that detects ends of the sheet S in a width direction may be disposed between the driven roller 121 and the driven roller 133. Furthermore, another driven roller 132 may be disposed between the driven roller 134 and the driven roller 141.

The processing section 103 includes the head unit 115 and the recording head 151 is disposed in the head unit 115. In the embodiment, a plurality of recording heads 151 corresponding to different colors from each other are provided and, for example, four recording heads 151 corresponding to yellow, cyan, magenta, and black are provided. Each of the recording heads 151 faces the front surface of the sheet S winding on the platen drum 130 with a slight clearance (platen gap) and ejects the function liquid of corresponding color from nozzles with ink jet type. Then, each of the recording heads 151 ejects the function liquid on the sheet S that is transported in the transport direction Ds and thereby a color image is formed on the front surface of the sheet S.

In addition, in the embodiment, as the function liquid, ultraviolet (UV) ink (light-curable ink) that is cured by radiation of ultraviolet rays (light) is used. Therefore, a first UV light source 161 (light radiation section) is provided in the head unit 115 of the processing section 103 to fix the UV ink to the sheet S by temporarily curing the UV ink. The first UV light source 161 for temporal curing is disposed between each of the plurality of recording heads 151. That is, the first UV light source 161 cures (temporally cures) the UV ink to an extent that a shape of the UV ink does not collapse by applying weak ultraviolet rays. On the other hand, a second UV light source 162 is provided on the downstream side of the transport direction Ds with respect to the plurality of recording heads 151 (head unit 115) as a curing section for main curing. That is, the second UV light source 162 cures the UV ink completely (main curing) by applying the ultraviolet rays that is more intensive than the first UV light source 161. It is possible to fix the color image which is formed by the plurality of recording heads 151 to the sheet S by executing temporal curing and main curing described above.

The laser scanner apparatus 7 is provided to partially cut or divide the sheet S on which the image is recorded. Moreover, since the configuration of the laser scanner apparatus 7 is the same as the configuration described above (see FIG. 8), detailed description will be omitted.

The laser light oscillated by the laser oscillator 401 of the laser scanner apparatus 7 is applied to the sheet S that is the workpiece via the first lens 403 of which the position is controlled by the stepping motor 3A, the first mirror 407, and the second mirror 409, and the like of which the rotation positions (angles) are controlled by the stepping motors 3B and 3C. As described above, an irradiation positions of laser light LA applied to the sheet S are controlled by each of the stepping motors 3A, 3B, and 3C, and the laser light LA can be applied to a desired position on the sheet S. A portion of the sheet S to which the laser light LA is applied is fused, is partially cut, or is divided.

Moreover, the portion that is cut or divided by the laser light LA may be discharged and stored in a storage section by a discharging section (not illustrated) after being fused, or may be transported to the winding shaft 140 while being held to a substrate of the sheet S by adhesive.

Furthermore, in this configuration, an example, in which the sheet S is cut or divided by fusing the sheet S using the laser scanner apparatus 7 after the image is recorded, is described, but the configuration is not limited to the example, and a configuration, in which a desired position is cut or divided before the image is recorded, may be provided.

According to the image recording apparatus 100 described above, it is possible to control the position (electrical angle $\theta e$) of the rotor of the stepping motors 3A, 3B, and 3C with high precision to control the irradiation position of the laser light LA. That is, the stepping motors 3A, 3B, and 3C can calculate the position (electrical angle $\theta e$) of the rotor with high precision based on the counter-electromotive voltage generated in the coils thereof without providing sensor (encoder and the like) detecting the position of the rotor. Thus, the image recording apparatus 100 can cut or divide the sheet S with high precision.

Second Configuration Example of Recording Apparatus

Figure 11:
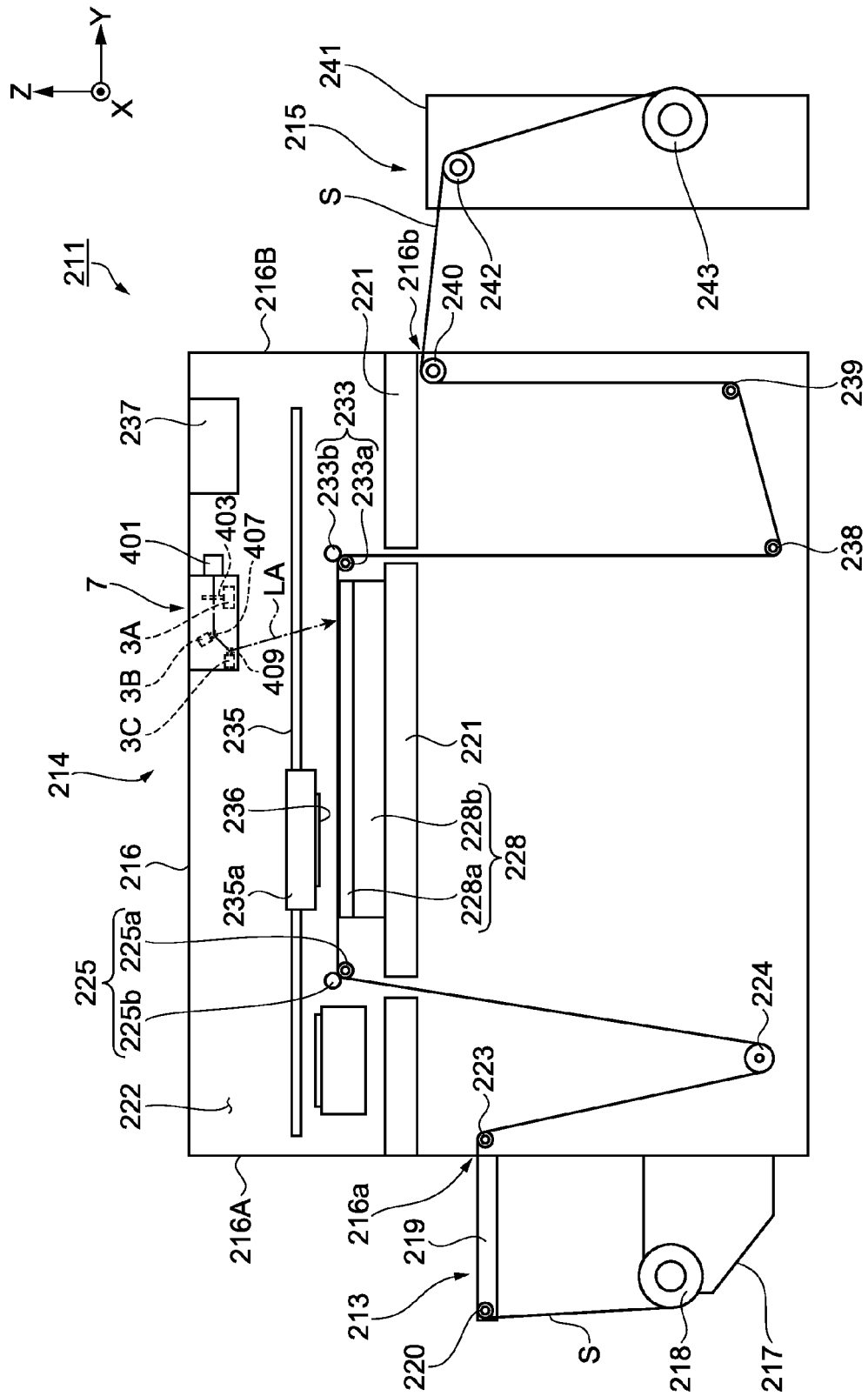
FIG. 11 is an external front view schematically illustrating a second configuration example of a recording apparatus including the control device of the motor according to the embodiment of the invention.

Next, as a second configuration example of the recording apparatus including the control device 1 and the stepping motor 3 described above, a printer (recording apparatus) 211 including a planar platen will be described. FIG. 11 is a front view schematically illustrating the second configuration example of the recording apparatus including the laser scanner apparatus 7 to which the control device 1 of the motor and the stepping motor 3 according to the embodiment described above are applied.

As illustrated in FIG. 11, the printer (recording apparatus) 211 employs an ink jet type as a printing system in which a liquid is ejected on the sheet S from a plurality of recording heads (liquid ejecting heads). In addition, the printer (recording apparatus) 211 performs printing while sequentially feeding one sheet S (web) as a recording medium wound in a roll shape and winds the sheet S again in the roll shape after printing. Since the sheet S is similar to the first configuration example described above, the description will be omitted here.

Moreover, in the embodiment, an XYZ orthogonal coordinate system is set in which a width direction of the sheet S in a horizontal plane is an X direction, the transport direction of the sheet S orthogonal to the X direction is a Y direction, and a vertical direction is a Z direction.

The printer 211 includes a body section 214 executing a printing process, a feeding section 213 supplying the sheet S to the body section 214, and a winding section 215 winding the sheet S discharged from the body section 214.

The body section 214 includes a body case 216, the feeding section 213 is disposed on an upstream side (-Y side) of the body case 216 in the transport direction, and the winding section 215 is disposed on a downstream side (+Y side) of the body case 216 in the transport direction. The feeding section 213 is connected to a medium supply section 216a provided in a side wall 216A of the body case 216 on the upstream side (-Y side) in the transport direction. The winding section 215 is connected to a medium discharge section 216b provided in a side wall 216B on the downstream side (+Y side) in the transport direction.

The feeding section 213 includes a support plate 217 mounted on a lower portion of the side wall 216A of the body case 216, a winding shaft 218 provided on the support plate 217, a feeding stand 219 connected to the medium supply section 216a of the body case 216, and a relay roller 220 provided at a tip end of the feeding stand 219. The sheet S wound in the roll shape is supported on the winding shaft 218 to be rotatable. The sheet S fed from the roll is wound on the relay roller 220, is moved onto an upper surface of the feeding stand 219, and is transported to the medium supply section 216a along the upper surface of the feeding stand 219.

The winding section 215 includes a winding frame 241, a relay roller 242 and a winding driving shaft 243 which are provided in the winding frame 241. The sheet S discharged from the medium discharge section 216b is wound on the relay roller 242, is guided to the winding driving shaft 243, and is wound in the roll shape by driving of the winding driving shaft 243 to be rotated.

A the planar base 221 is disposed horizontally inside the body case 216 of the body section 214 and the inside of the body case is divided into two spaces by the base 221. A space above the base 221 is a printing chamber 222 in which the printing process is executed on the sheet S. The printing chamber 222 is provided with a platen (medium support section) 228 fixed to the base 221, a recording head (recording processing section) 236 provided above the platen 228, a carriage 235a supporting the recording head 236, two guide shafts 235 supporting the carriage 235a, a valve unit 237, and the laser scanner apparatus 7 cutting the sheet S. The two guide shafts 235 are disposed parallel to each other along the transport direction (Y direction) and are configured such that the carriage 235a is capable of reciprocating in the transport direction.

The platen 228 has a box-shaped support stand 228a of which an upper surface is opened and a mounting plate 228b mounted on an opening of the support stand 228a. The support stand 228a is fixed to the base 221 and an inside thereof surrounded by the support stand 228a and the mounting plate 228b is a negative-pressure chamber. The sheet S is mounted on the support surface (medium support surface that is the upper surface in a +Z direction in the drawing) of the mounting plate 228b.

A plurality of suction holes (not illustrated) passing through the mounting plate 228b in a thickness direction are formed in the mounting plate 228b. In one side wall (side wall on the -Y side in the embodiment) of the support stand 228a, an exhaust port (not illustrated) passing through the side wall is formed. A suction fan (not illustrated) is connected to the exhaust port. A suction force is operated on the sheet S through the plurality of suction holes by suction of the suction fan and it is possible to make the sheet S flat by absorbing the sheet S on the support surface of the mounting plate 228b.

A supply transport system including a plurality of transport rollers is provided on the upstream side (−Y side) of the platen 228 in the transport direction. The supply transport system includes a pair of first transport rollers 225 provided inside the printing chamber 222 in the vicinity of the platen 228, a relay roller 224 provided in a space of a lower side of the body case 216, and a relay roller 223 provided in the vicinity of the medium supply section 216a.

The pair of first transport rollers 225 are configured of a first driving roller 225a and a first driven roller 225b.

In the supply transport system, the sheet S introduced into the inside of the body case 216 from the feeding section 213 through the medium supply section 216a is wound from below on the first driving roller 225a via the relay rollers 223 and 224, and is nipped by the pair of first transport rollers 225. Then, the sheet S is horizontally fed on the support surface of the platen 228 from the pair of first transport rollers 225 according to rotation of the first driving roller 225a that is driven by a first transport motor (not illustrated).

On the other hand, a discharge transport system including a plurality of transport rollers is provided on the downstream side (+Y side) of the platen 228 in the transport direction. The discharge transport system includes a pair of second transport rollers 233 that is provided on a side opposite to the pair of first transport rollers 225 with respect to the platen 228, a reverse roller 238 and a relay roller 239 which are provided in the space of the lower side of the body case 216, and a delivery roller 240 that is provided in the vicinity of the medium discharge section 216b.

The pair of second transport rollers 233 is configured of a second driving roller 233a and a second driven roller 233b. Moreover, since the second driven roller 233b is disposed on the printing surface side (upper surface side) of the sheet S, the second driven roller 233b may be configured so as to abut only end edge portions of the sheet S in the width direction (X direction) to avoid damage of the printed image.

In the discharge transport system, the pair of second transport rollers 233 nipping the sheet S delivers the sheet S from above the platen 228 according to rotation of the second driving roller 233a driven by a second transport motor (not illustrated). The sheet S fed from the pair of second transport rollers 233 is transported to the delivery roller 240 via the reverse roller 238 and the relay roller 239, and is fed to the winding section 215 through the medium discharge section 216b by the delivery roller 240.

In the embodiment, the plurality of recording heads 236 are mounted on the carriage 235a through a head mounting plate (not illustrated). The head mounting plate is configured to be movable on the carriage 235a in the width direction (X direction) of the medium. A position of the head mounting plate is capable of being controlled and the head mounting plate can allow the plurality of recording heads 236 to integrally perform a line feed operation by moving the head mounting plate in the width direction (X direction) of medium. The recording heads 236 are disposed side by side at constant intervals in the width direction of the medium on the head mounting plate such that the adjacent recording heads 236 are configured of two stages different from each other in the transport direction (Y direction) of the medium.

The plurality of recording heads 236 are respectively connected to the valve unit 237 through ink supply tubes (not illustrated). The valve unit 237 is provided on an inner wall of the body case 216 within the printing chamber 222 and is connected to an ink tank (ink storage section) (not illustrated). The valve unit 237 supplies the ink supplied from the ink tank to the recording head 236 while temporarily stores the ink.

A plurality of ink ejecting nozzles are provided on a lower surface (nozzle forming surface) of the recording head 236 in parallel in the width direction (X direction) of the medium. The recording head 236 ejects ink supplied from the valve unit 237 from the ink ejecting nozzles to the sheet S on the platen 228 and performs printing. Moreover, the recording head 236 may have a plurality of ink ejecting nozzle columns. In this case, when performing four-color or six-color printing, if ink is allocated in each of ink ejecting nozzle columns for each color type, it is possible to eject the ink of a plurality of colors with one recording head 236.

The laser scanner apparatus 7 is included in the inside of the body case 216 of the body section 214. The laser scanner apparatus 7 is provided on the downstream side (Y side) further than the ejecting position of the ink described above. The laser scanner apparatus 7 is provided to partially cutting or dividing the sheet S on which the image is recorded. Moreover, since the configuration of the laser scanner apparatus 7 is similar to the configuration (see FIG. 8) described above, detailed description will be omitted.

The laser light oscillated by the laser oscillator 401 of the laser scanner apparatus 7 is applied to the sheet S that is the workpiece via the first lens 403 of which the position is controlled by the stepping motor 3A, the first mirror 407, and the second mirror 409 of which the rotation positions (angles) are controlled by the stepping motors 3B and 3C. As described above, the irradiation position of the laser light LA radiated on the sheet S is controlled by each of the stepping motors 3A, 3B, and 3C and the laser light can be applied to a desired position on the sheet S. A portion of the sheet S to which the laser light LA is applied is fused, is partially cut, or is divided.

Moreover, the portion that is cut or divided by the laser light LA may be discharged and stored in a storage section by a discharge section (not illustrated) after being fused, or may be transported to the winding section 215 while being held to a substrate of the sheet S by adhesive.

Furthermore, in this configuration, an example, in which the sheet S is cut or divided by fusing the sheet S using the laser scanner apparatus 7 after the image is recorded by ejecting the ink, is described, but the configuration is not limited to the example, and a configuration, in which a desired position of the sheet S is cut or divided before the image is recorded, may be provided.

According to the printer (recording apparatus) 211 described above, it is possible to control the position (electrical angle θe) of the rotor of the stepping motors 3A, 3B, and 3C with high precision to control the irradiation position of the laser light LA. That is, the stepping motors 3A, 3B, and 3C can calculate the position (electrical angle θe) of the rotor with high precision based on the counter-electromotive voltage generated in the coils thereof without providing sensor (encoder and the like) detecting the position of the rotor. Thus, the printer (recording apparatus) 211 can cut or divide the sheet S with high precision.

As described above, the control device and the control method of the motor, the electronic apparatus, and the recording apparatus are described based on the illustrated embodiments, but the invention is not limited to the embodiments. The configuration of each section can be replaced with any configuration having similar function. Furthermore, other optional configurations may be added to the invention.

The entire disclosure of Japanese Patent Application No. 2014-190982, filed Sep. 19, 2014 and No. 2015-114532, filed Jun. 5, 2015 are expressly incorporated by reference herein.

What is claimed is:

1. A control device of a motor that rotates a rotor by a magnetic flux generated by supplying an excitation current to a coil, the control device of a motor comprising:
 a detection section that detects a value of a counter-electromotive voltage induced in the coil by rotation of the rotor;
 a normalizing section that normalizes the value of the counter-electromotive voltage by using a normalization coefficient according to a speed of rotation of the rotor; and
 a specifying section that specifies a position of the rotor based on the value of the counter-electromotive voltage that is normalized,
 wherein a value of the normalization coefficient is decreased with an increase in the speed when the speed is equal to or greater than a predetermined value and is a constant value when the speed is less than the predetermined value.

2. The control device of a motor according to claim 1, wherein the normalizing section normalizes the value of the counter-electromotive voltage by multiplying the normalization coefficient by the value of the counter-electromotive voltage induced in the coil, and.

3. The control device of a motor according to claim 1, wherein the specifying section specifies the position of the rotor by referring to a table storing the value of the counter-electromotive voltage that is normalized in association with the position of the rotor.

4. An electronic apparatus comprising:
 the control device of a motor according to claim 1.

5. A recording apparatus comprising:
 the control device of a motor according to claim 1.

6. A robot comprising:
 the control device of a motor according to claim 1.

7. A control method of a motor that rotates a rotor by a magnetic flux generated by supplying an excitation current to a coil, the control method of a motor comprising:
 detecting a counter-electromotive voltage induced in the coil by rotation of the rotor;
 normalizing a value of the counter-electromotive voltage by using a normalization coefficient according to a speed of rotation of the rotor; and
 specifying a position of the rotor based on the value of the counter-electromotive voltage that is normalized,
 wherein a value of the normalization coefficient is decreased with an increase in the speed when the speed is equal to or greater than a predetermined value and is a constant value when the speed is less than the predetermined value.

* * * * *